C. R. Edwards,
Shutter Worker.
No 669. Reissued Mar. 1, 1859.
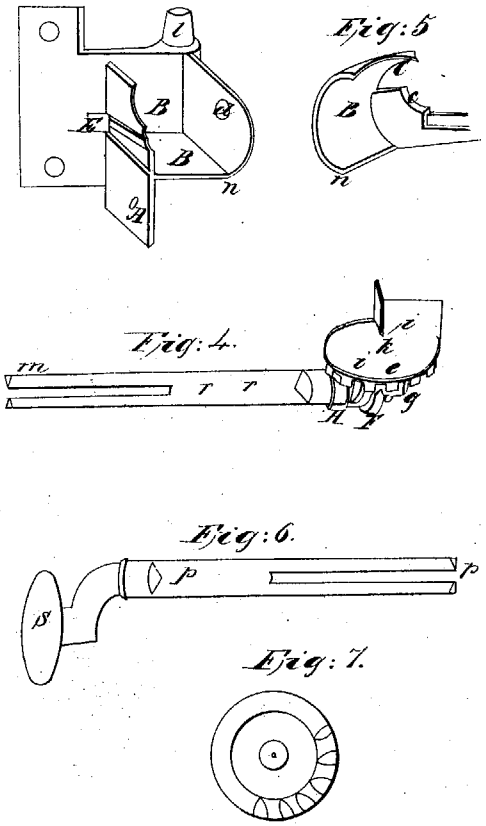
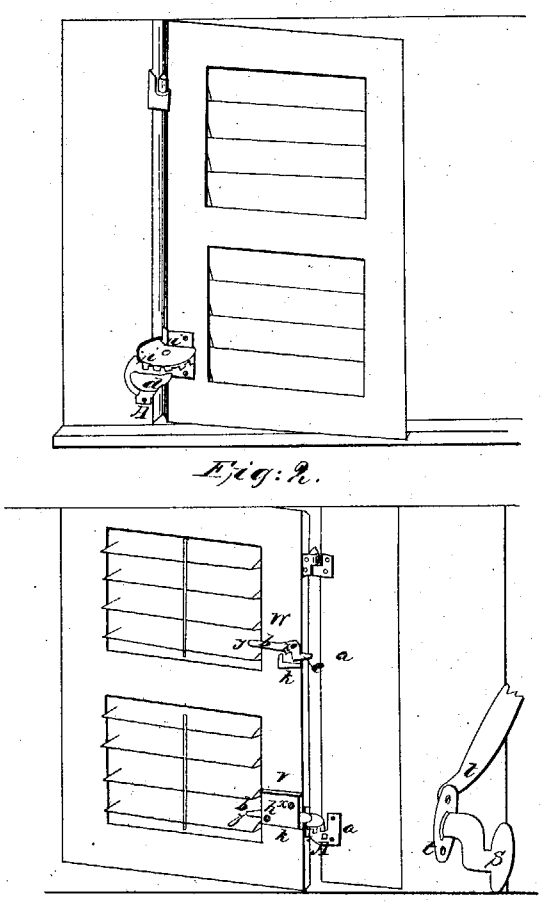
Witnesses:
Augustus L. Brooks
D. L. Russell
Inventor:
Charles R. Edwards
N. PETERS, PHOTO-LITHOGRAPHER, WASHINGTON, D. C.

UNITED STATES PATENT OFFICE.

CHARLES R. EDWARDS, OF NIAGARA CITY, NEW YORK.

IMPROVED SHUTTER-OPERATOR.

Specification forming part of Letters Patent No. 15,287, dated July 8, 1856; Reissue No. 669, dated March 1, 1859.

*To all whom it may concern:*

Be it known that I, CHARLES R. EDWARDS, of Niagara City, in the county of Niagara and State of New York, have invented certain new and useful Improvements in Mode of Operating Window Blinds and Slats; and I do hereby declare that the following is a full, clear, and exact description of the same, reference being had to the accompanying drawings and to the letters of reference marked thereon.

Figure 1 shows the appearance of the hinge on the outside of the building while the blind is nearly closed. Fig. 2 is a view from the inside. Fig. 3 is a nearly full-sized part of the hinge, and is fastened as a corner butt to the window-casing by screws at A A A. (See outside front view of same piece in Fig. 1, at letter A.)

In Fig. 4 the cog-wheel and butt *i i* are cast in one piece, and are to be fastened onto the blind, as shown in Fig. 1 at *i i*. The socket *k*, Fig. 4, is to be slipped on the gudgeon *l*, Fig. 3, which so far forms a hinge with wheel (or segment of a wheel) and cogs on its under side, covering (or nearly covering) the cavity B B, Fig. 3, and on opening the blind would turn horizontally over said cavity, as in Fig. 1; but before fastening any part of the hinge to the casing, a hole about three-fourths of an inch in diameter should be bored from outside to inside through the casing, and the shaft, Fig. 4, from M to H, shall be pushed in said hole. The hinge-piece, Fig. 3, should next be so fitted to the casing that the screw end of the shaft at F may revolve in the cavity B B′. The gudgeon *g* should also be entered in the socket *d*. Now, while thus fitted to the shaft, and before this part is screwed to the casing, take the piece shown in Fig. 5 and enter its end E just through the square hole E, in Fig. 3, so that its concave at B will form one side of the cavity B B and *n* unite to *n*. Next fasten this part of the hinge, Fig. 3, thus fitted to the casing, allowing *c c* to form a half-socket for the said shaft at H. The piece, Fig. 5, will be held to its place by the catch at O. After fastening the cog part of the hinge *i i* to the blind, and the blind being so hung that said cogs will mesh with the aforesaid screw-thread, as shown in Fig. 1, and the meshing of the screw, also illustrated by Fig. 4, take the knob-crank piece (shown in Fig. 6) and push its end from *p* to *p* into the aforesaid hole in the casing, and from the inside, so that it will unite and mesh with the other part of the shaft. (Shown in Fig. 4.) Said knob-crank may be made to enter through a round scutcheon or a guard-piece elongated so as to form a certain trimming, if desired, as shown at *t t* in Fig. 2.

Now, by turning the knob-crank, the screw-shaft is made to force open or shut the blind. Fig. 7 shows the shape and position of the cogs in relation to the center of the wheel. Said cogs are formed on the under side of said wheel, and made having a rolling taper. They may be made tapering, pointing toward the center of said wheel; but it is preferable to make the cogs as broad at the outer cylindrical surface of the wheel as can be meshed and operated with a spiral thread, and also taper on a roll that will mesh with said thread, and pointing, not toward a center of the wheel, but toward a point between the center of the wheel or socket and the casing, so that the extreme end of the shaft or screw need not project beyond the casing farther than the center of the wheel or socket of the hinge at *k*. The cogs thus described are illustrated in shape and position by Fig. 7. The tapering of the cogs, as described, allows the screw-thread to operate almost wholly under cover of the said wheel, and by operating the screw on the under side the whole construction, in all its proportions, is large enough and sufficiently compact to be practical on the thin window-casing of brick buildings. There is a slight projection on outer cylindrical edge of the cog-wheel, as shown at E E, Fig. 4, which, when the hinge is put together, juts over the piece, Fig. 5, at D, for the purpose of conducting off water, and in combination with the piece, Fig. 5, to protect both screws and cogs from the ice, while at the same time the piece, Fig. 5, is made to hold the screw firmly to its proper place.

The parts containing the socket *d*, Fig. 3, and the half-socket *c c*, Figs. 3 and 5, may be made flaring to correspond with the flaring window-casings, but the flare should be made in reference to the cavity or sockets without interfering with the angle of the butt.

Letter V in Fig. 2 represents the appearance of that part of the trimmings on the stile of the blind which, by means of the above-described combination, and by slightly turning the aforesaid knob-crank S, causes the lattice to open or shut and fasten.

Letter W, Fig. 2, shows the construction of the spring and knee-lever (see *y*, *b*, *x*, *e*,) and the slide-catch *k*, which are covered at the letter V by a thin iron cap piece.

At X a screw passes through the cap piece and knee-lever, fastening the same to the blind and also forming a fulcrum for the said lever. The end of the lever at *y* is connected by a staple near the end and edge of a lattice-slat, and by a wire about three-fourths of an inch long hooked at one end into the said staple and at its other and lever end hooked into the lever at *y*.

The knob-crank or key, Fig. 6, is used for the several purposes of operating the lattice and adapting itself to thick or thin casings, as well as to be used as a portable key to be used for opening several blinds.

By operating the lattice by a slight movement of the blind through the hinge, it thus avoids the extra expense of forming a separate connection to operate the lattice from the inside.

The knob-crank is easily cast to fit.

Now, turn the knob crank S so as to shut the blind firmly, and the knee-lever at *e* is pressed against a part of the butt, or it may be brought against the head of a screw, as at *a*, which pressure causes the end of the lever at *y* to rise and shut the lattice, and when the knob-crank is turned so as to cause the blind to be three-fourths of an inch (or less) farther from the center of the window the pressure on the lever at *e* will be removed, so that the lattice will open if made to fall by weight or gravity, or a spiral spring (wire) may be attached to said lever at *b* and a nail drove through a loop at the lower end and into the stile, as at Z, so that it will draw down a lever at *y*. If, when the blind is open, it is ever desired, the lattice may be closed by the hand and fastened closed by sliding the catch K under the lever. For this object an open space, *k*, in the cap-piece V, is made for a projection on the catch *k* to slide in. In order to prevent the end of the lever at *y* from dropping too low, a small screw is put through the cap-piece under the lever at *h*, which also helps to fasten on the cap-piece V. The center of the aforesaid cog-wheel and the gudgeon *l*, Fig. 3, on which it turns, may be made so as to vary in the distance which the hinges are required to project from the casing to be practical for brick as well as wood buildings.

Having thus fully described my invention, what I claim as new, and desire to secure by Letters Patent, is—

The employment of a single shaft operated internally, and operating externally upon a window-blind when said shaft is made to effect the double purpose of operating both the blind and its slats, and this whether I construct and arrange the hinge and levers in the manner herein specified or not.

CHAS. R. EDWARDS.

Witnesses:
A. A. YEATMAN,
C. M. ALEXANDER.